(12) United States Patent
Muramatsu

(10) Patent No.: US 10,400,717 B2
(45) Date of Patent: Sep. 3, 2019

(54) AIR-BYPASS VALVE CONTROL DEVICE

(71) Applicant: SUBARU CORPORATION, Tokyo (JP)

(72) Inventor: Konosuke Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 15/598,042

(22) Filed: May 17, 2017

(65) Prior Publication Data

US 2018/0030939 A1 Feb. 1, 2018

(30) Foreign Application Priority Data

Jul. 28, 2016 (JP) ................ 2016-148505

(51) Int. Cl.
*F02M 35/10* (2006.01)
*F02D 9/02* (2006.01)
(Continued)

(52) U.S. Cl.
CPC ....... *F02M 35/10163* (2013.01); *F02B 37/16* (2013.01); *F02D 9/02* (2013.01); *F02D 41/0005* (2013.01); *F02D 41/0007* (2013.01); *F02D 41/107* (2013.01); *F02D 41/18* (2013.01); *F02M 35/10386* (2013.01);
(Continued)

(58) Field of Classification Search
CPC ......... F02D 41/0007; F02D 2700/0246; F02D 2700/0248; F02D 2700/0251; F02D 41/0005; F02B 37/16; F02B 37/162
USPC ......... 123/559.1, 559.2, 561, 562, 564, 565; 60/598, 600, 601, 611
See application file for complete search history.

(56) References Cited

U.S. PATENT DOCUMENTS 4,426,973 A * 1/1984 Nakano ................ F02P 5/1508
123/406.52
5,115,788 A * 5/1992 Sasaki ................... F02B 33/36
123/559.3
(Continued)

FOREIGN PATENT DOCUMENTS

JP S61-28716 A 2/1986
JP H08-61073 A 3/1996
(Continued)

OTHER PUBLICATIONS

Japanese Office Action dated Mar. 29, 2018, in Japanese Patent Application No. 2016-148505 (4 pages with English translation).

*Primary Examiner* — Sizo B Vilakazi
*Assistant Examiner* — Kevin R Steckbauer
(74) *Attorney, Agent, or Firm* — Smith, Gambrell & Russell, LLP

(57) ABSTRACT

An air-bypass valve control device is disposed in an engine. The engine includes an intake passage, a compressor, a throttle valve, an air-bypass passage and the air-bypass valve. The air-bypass valve control device includes an intake air amount detector, a controller. The intake air amount detector detects an intake air amount of the engine. The controller configured to temporarily bring the air-bypass valve into an opened state in the case where the intake air amount of the engine immediately before a decrease in an opening degree of the throttle valve is equal to or larger than a predetermined value when the opening degree of the throttle valve decreases at a predetermined speed or higher.

16 Claims, 7 Drawing Sheets

(51) Int. Cl.
*F02D 41/00* (2006.01)
*F02D 41/10* (2006.01)
*F02D 41/18* (2006.01)
*F02B 37/16* (2006.01)
*F02B 37/12* (2006.01)

(52) U.S. Cl.
CPC ... *F02B 2037/125* (2013.01); *F02B 2037/162* (2013.01); *F02D 2200/0408* (2013.01); *F02D 2200/0411* (2013.01); *F02D 2200/101* (2013.01); *Y02T 10/144* (2013.01); *Y02T 10/42* (2013.01)

(56) References Cited

U.S. PATENT DOCUMENTS

| | | | | |
|---|---|---|---|---|
| 7,529,614 B1* | 5/2009 | Muller | | F02B 37/16 123/559.1 |
| 7,578,128 B2* | 8/2009 | Miyauchi | | F02B 37/16 123/561 |
| 9,140,178 B2* | 9/2015 | Pursifull | | F02B 29/0468 |
| 9,739,220 B2* | 8/2017 | Matsubara | | F02D 41/0007 |
| 10,100,722 B2* | 10/2018 | Nishio | | F02D 41/0007 |
| 2008/0022968 A1* | 1/2008 | Miyauchi | | F02B 37/16 123/339.15 |
| 2014/0290630 A1* | 10/2014 | Pursifull | | F02B 29/0468 123/564 |
| 2015/0369149 A1* | 12/2015 | Matsubara | | F02D 41/0007 701/103 |
| 2017/0089276 A1* | 3/2017 | Sunagare | | F02D 41/0007 |
| 2017/0114736 A1* | 4/2017 | Iida | | F02B 33/446 |
| 2017/0145907 A1* | 5/2017 | Nishio | | F02D 41/0007 |

FOREIGN PATENT DOCUMENTS

| | | |
|---|---|---|
| JP | H08-189368 A | 7/1996 |
| JP | 2007-162545 A | 6/2007 |
| JP | 2008-038811 A | 2/2008 |
| JP | 2009-299506 A | 12/2009 |
| JP | 2010-38077 A | 2/2010 |
| JP | 2010-265854 A | 11/2010 |
| JP | 2012-180746 A | 9/2012 |

\* cited by examiner

AIR-BYPASS VALVE CONTROL DEVICE

CROSS-REFERENCE TO RELATED APPLICATIONS

The present application claims priority from Japanese Patent Application No. 2016-148505 filed on Jul. 28, 2016, the entire contents of which are hereby incorporated by reference.

BACKGROUND

1. Technical Field

The present invention relates to an air-bypass valve control device, the air-bypass valve opening/closing an air-bypass passage for a compressor of a turbocharger and, in particular to, an air-bypass valve control device that prevents occurrence of compressor surge without deteriorating drivability.

2. Related Art

A turbocharger provided in an automotive engine or the like, for instance, is a supercharger that uses a turbine driven by energy of exhaust gas to drive a compressor that compresses fresh air (combustion air).

In the engine that turbocharges, when a throttle valve is rapidly closed from a state where a throttle valve opening degree is large and supercharging pressure is high, pressure is rapidly increased in a portion between the compressor and the throttle valve, and compressor surge as a pressure vibration occurs in an intake passage between blades of the compressor and the throttle valve. As a result, unique noise is possibly generated, and reliability of the turbocharger is possibly deteriorated due to application of a force to the blades of the compressor, the force being in a reverse direction from rotation of the blades.

For this reason, the turbocharged engine is provided with: an air-bypass passage that bypasses the compressor between an upstream side and a downstream side thereof and causes some of the air in the portion between the compressor and the throttle valve to flow back to the upstream side of the compressor; and an air-bypass valve that opens/closes this air-bypass passage.

As related art related to prevention of the compressor surge, for instance, Japanese Unexamined Patent Application Publication (JP-A) No. 2010-265854 discloses an engine that turbocharges. In the engine, when it is determined that a compressor is brought into a surging state on the basis of information from an engine rotational speed sensor and an accelerator opening degree sensor, a bypass valve is opened to communicate between an upstream side and a downstream side of the compressor. When it is determined that the surging state is terminated, the bypass valve is closed.

JP-A No. 2009-299506 discloses that, when an operation point of a compressor defined by an intake air amount of an engine and an intake air pressure ratio before and after a compressor is located in a surge occurrence region, a throttle valve and an impulse valve that is provided on a downstream side of a surge tank are driven to be opened/closed so as to inhibit surge.

JP-A No. 2012-180746 discloses surge suppression control using: a bypass passage that bypasses a compressor; and a bypass valve. In the surge suppression control, downstream pressure of the compressor is controlled to obtain a target value, so as to avoid rapid changes in an intake air amount and supercharging pressure.

When an electric air-bypass valve that is driven by an electric actuator such as a solenoid is used as in the above-described related art, freedom in design of open/close timing is improved in comparison with an existing mechanical air-bypass valve, and precise control can be constructed.

In addition, actuation malfunction as a problem inherent to the mechanical air-bypass valve and the compressor surge caused by a response delay during valve opening can be prevented. Furthermore, unintentional relief of the intake air pressure, which is caused by fatigue of a spring due to aging, and the like can also be solved.

However, regardless of adoption of the electric air-bypass valve, when the air-bypass valve is opened in a region where opening thereof is unnecessary under normal circumstances as a result of inappropriate control, a time response delay occurs to an increase in the supercharging pressure during re-acceleration, which deteriorates drivability (timely response to a driver's operation). For this reason, it is desired to minimize valve opening to prevent the compressor surge while reliably inhibiting the compressor surge.

The inventor of the present invention acquired such findings that the intake air amount of the engine was a dominant factor influencing an amplitude of a pressure fluctuation on the upstream side of the throttle valve during the occurrence of the compressor surge.

It is understood that, in the case where the intake air amount of the engine is the same before and after rapid closing of the throttle valve, a flow rate of the air to the downstream side of the throttle valve decreases and a state where the pressure on the upstream side of the throttle valve is high continues over a long period as an rotational speed (the speed) of the output shaft of the engine decreases; therefore, the compressor surge is more likely to occur.

In the case where the throttle valve is not fully closed but is opened at a predetermined opening degree or larger after rapid closing thereof, even when the throttle valve is rapidly closed to this opening degree, the flow rate of the air to the engine side is secured to a certain extent thereafter. Thus, the compressor surge is less likely to occur.

In the case where the rotational speed of the output shaft of the engine is low when the engine is revved (raced) in a non-travel state of the vehicle, mechanical noise generated by the engine itself as well as noise such as intake/exhaust noise is low. As a result, actuation noise that is generated during opening/closing of the air-bypass valve is no longer masked by the engine noise. As a result, while the occurrence of the compressor surge can be prevented by actuation of the air-bypass valve, it is concerned that the actuation noise gives a sense of discomfort to a user.

SUMMARY OF THE INVENTION

It is desirable to provide an air-bypass valve control device that prevents occurrence of compressor surge without deteriorating drivability.

An aspect of the present invention provides an air-bypass valve control device configured to be installed in an engine. The engine includes: an intake passage configured to introduce air into the engine; a compressor provided in the intake passage and capable of compressing the air; a throttle valve disposed downstream of the compressor in the intake passage; an air-bypass passage configured to bypass the compressor from an upstream region to a downstream region thereof in the intake passage; and an air-bypass valve configured to be driven by an electric actuator to open/close the air-bypass passage, and is configured to control the air-bypass valve. The air-bypass valve control device includes: an intake air amount detector configured to detect an intake air amount of the engine; and a controller configured to temporarily bring the air-bypass valve into an opened state in the case where the intake air amount of the engine immediately before a decrease in an opening degree of the throttle valve is equal to or larger than a first predetermined value when the opening degree of the throttle valve decreases at a predetermined speed or higher.

The first predetermined value may be set such that the air-bypass valve is temporarily brought into the opened state in the case where an amplitude of a pressure fluctuation in the intake passage becomes equal to or larger than a second predetermined value. The expected amplitude is an amplitude expected when the air-bypass valve is maintained in a closed state The first predetermined value may be set to decrease in accordance with a decrease in a rotational speed of the output shaft of the engine.

The controller may be configured to set a valve open period at a time when the air-bypass valve is temporarily brought into the opened state to be extended in accordance with an increase in the intake air amount of the engine immediately before the decrease in the opening degree of the throttle valve.

The controller may be configured to set the valve open period at the time when the air-bypass valve is temporarily brought into the opened state to be extended in accordance with the decrease in the rotational speed of the output shaft of the engine.

The controller may be configured to maintain the air-bypass valve in the closed state in the case where a target opening degree of the throttle valve after a closing operation of the throttle valve is equal to or larger than a predetermined upper limit value.

The controller may be configured to maintain the air-bypass valve in the closed state in the case where a vehicle equipped with the engine is in a non-travel state and the rotational speed of the output shaft of the engine is equal to or lower than a predetermined lower limit value.

DETAILED DESCRIPTION

A purpose of providing an air-bypass valve control device that prevents occurrence of compressor surge without deteriorating drivability is achieved in the present invention by temporarily opening an air-bypass valve in the cases where an intake air amount of an engine is equal to or larger than a specified value and driver requested torque rapidly decreases, and by setting a valve open period to be extended in accordance with an increase in the intake air amount and a decrease in an engine rotational speed.

Example

A description will hereinafter be made on an example of an air-bypass valve control device, to which the present invention is applied.

The air-bypass valve control device of the example is provided in a turbocharged engine that is, for instance, mounted as a traveling power source on an automobile such as a passenger car and that has an electric air-bypass valve.

Figure 1:
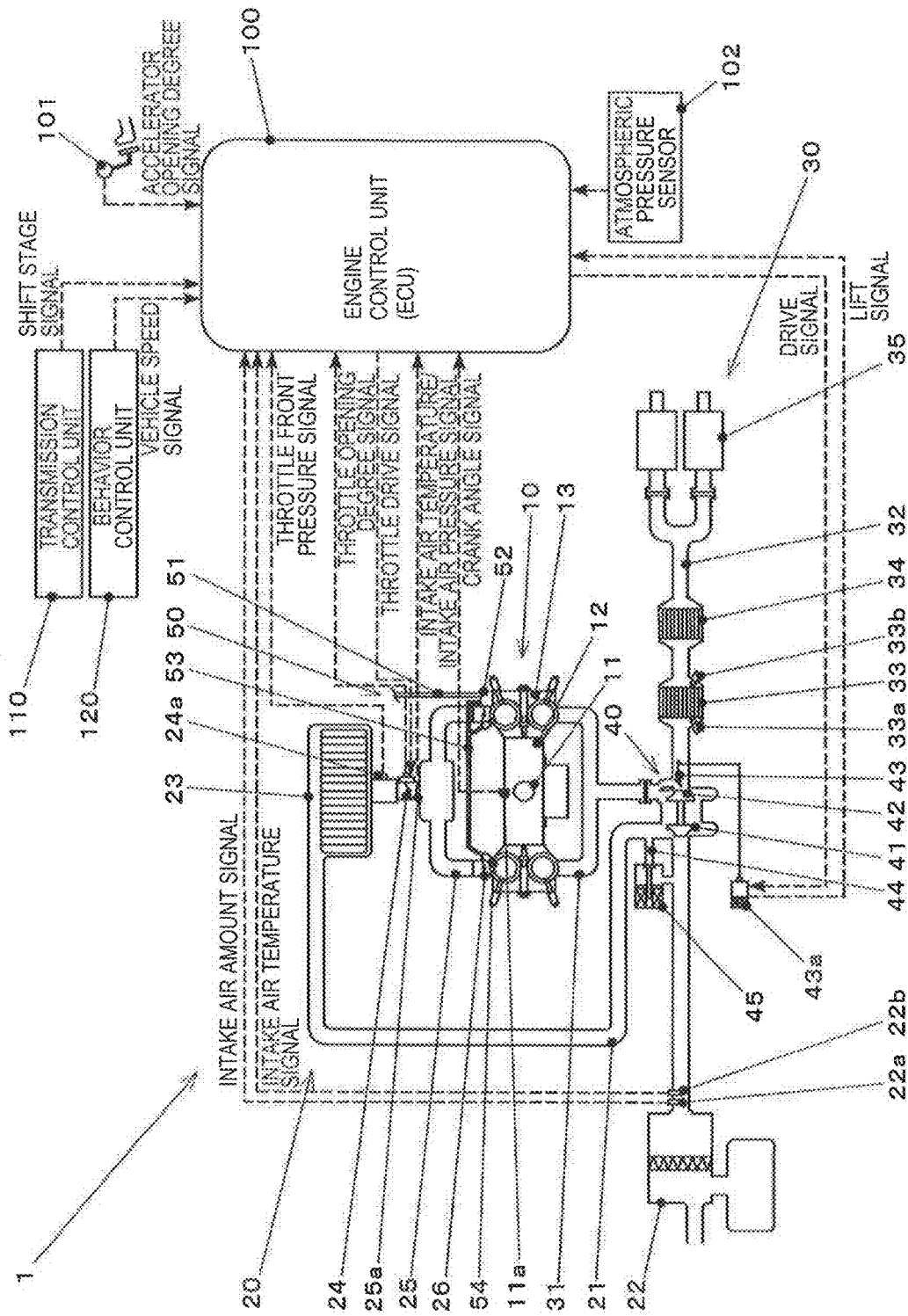
FIG. 1 is a view that schematically illustrates a configuration of an engine having an example of an air-bypass valve control device, to which the present invention is applied.

FIG. 1 is a view that schematically illustrates a configuration of an engine having the air-bypass valve control device of the example.

An engine 1 is a horizontally-opposed four-cylinder four-stroke DOHC direct injection gasoline engine, for instance.

The engine 1 includes a main body 10, an intake system 20, an exhaust system 30, a turbocharger 40, a fuel supply device 50, an engine control unit 100, and the like.

The main body 10 is a primary component of the engine 1 and has a crankshaft 11, a cylinder block 12, a cylinder head 13, and the like.

The crankshaft 11 is an output shaft of the engine 1 and includes a piston pin by which an unillustrated piston of each cylinder is coupled thereto via a connecting rod.

The crankshaft 11 is provided with a crank angle sensor 11a that successively detects an angle position thereof.

The crank angle sensor 11a outputs a pulse signal at a proportional frequency to a rotational speed of the crankshaft 11.

The output of the crank angle sensor 11a is transmitted to the engine control unit 100 and used for detection of the rotational speed (number of rotation per unit time) of the crankshaft 11, and the like.

The cylinder block 12 is a block-shaped member that includes each of the cylinders.

The cylinder block 12 is divided into two with a rotation center axis of the crankshaft 11 being interposed therebetween. One half thereof is provided with first and third cylinders, and the other half thereof is provided with second and fourth cylinders.

A central portion of the main body 10, to which the halves of the cylinder block 12 are joined, is provided with a crankcase accommodating: a main bearing that supports a journal of the crankshaft 11 in a manner to allow rotation thereof; and the crankshaft 11.

The cylinder head 13 is provided at opposite ends of the halves of the cylinder block 12 from the crankshaft 11 side.

The cylinder head 13 is provided with combustion chambers, intake ports, exhaust ports, intake/exhaust valves, drive systems thereof, ignition plugs, and the like.

The combustion chamber is a portion that cooperates with a cylinder bore and a piston crown surface to constitute a space in which air-fuel mixture is burned.

In a joined surface of the cylinder head 13 to the cylinder block 12, a region that opposes the piston crown surface is recessed to provide the combustion chamber.

The intake port is a passage through which fresh air (combustion air) is introduced into the combustion chamber.

The exhaust port is a passage through which exhaust gas (burnt gas) is discharged from the combustion chamber.

The intake valve and the exhaust valve respectively open/close the intake port and the exhaust port at predetermined valve timing.

The intake valve and the exhaust valve are respectively driven by an intake camshaft and an exhaust camshaft.

The intake camshaft and the exhaust camshaft synchronously rotate at half the rotational speed of the crankshaft 11 by a power transmission unit such as a timing chain and each include a valve timing variable mechanism that can advance or delay a phase of a cam rotor in accordance with a command from the engine control unit 100.

The ignition plug produces an electric spark in the combustion chamber in accordance with an ignition signal from the engine control unit 100, so as to ignite the air-fuel mixture.

The intake system 20 suctions external air around a vehicle and introduces the external air as the combustion air (the fresh air) into the intake ports of the cylinder head 13.

The intake system 20 has an intake duct 21, an air cleaner 22, an intercooler 23, a throttle valve 24, an intake manifold 25, a tumble generation valve 26, and the like.

The intake duct 21 is an intake passage through which the external air is introduced and delivered to the intake ports.

The intake duct 21 is sequentially provided with the air cleaner 22, a compressor 41 of the turbocharger 40, the intercooler 23, the throttle valve 24, and the like from an upstream side thereof (a far side thereof from the intake port).

An outlet portion of the intake duct 21 is coupled to an inlet portion of the intake manifold 25.

The air cleaner 22 filters the fresh air by using a cleaner element such as unwoven cloth to remove foreign substances such as dust therefrom.

The air cleaner 22 is provided near an inlet portion of the intake duct 21.

An airflow meter 22a and an intake air temperature sensor 22b are provided at an outlet portion of the air cleaner 22.

The airflow meter 22a is a sensor that detects a flow rate of the air flowing through the intake duct 21 (an intake air amount of the engine 1).

In one implementation, the airflow meter 22a may serve as an "intake air amount detector".

The intake air temperature sensor 22b is a sensor that detects a temperature of the air flowing through the intake duct 21.

The intercooler 23 cools the fresh air that has been pressurized by the compressor 41.

The intercooler 23 is, for instance, a heat exchanger that cools the fresh air through heat exchange with airflow (travel wind) generated around a vehicle body during a travel of the vehicle.

The throttle valve 24 is a butterfly valve that is provided near a downstream end of the intake duct 21 (a coupled portion thereof to the intake manifold 25).

The throttle valve 24 adjusts the intake air amount for output control of the engine 1.

The throttle valve 24 is an electric throttle valve that is driven by an electric actuator.

An opening degree of the throttle valve 24 is controlled such that actual torque of the engine 1 approximates the driver requested torque set by the engine control unit 100 on the basis of a detection value of an accelerator pedal sensor 101, for instance.

The throttle valve 24 is provided with an opening degree sensor that detects the opening degree thereof.

Output of the opening degree sensor is transmitted to the engine control unit 100.

A throttle upstream pressure sensor 24a is provided on an inlet side of the throttle valve 24.

The throttle upstream pressure sensor 24a detects pressure in the intake duct 21 on an upstream side of the throttle valve 24 (the compressor 41 side).

Output of throttle upstream pressure sensor 24a is transmitted to the engine control unit 100.

The intake manifold 25 is a branch pipe distributing the air that has flowed through the throttle valve 24 to the intake port of each of the cylinders.

The intake manifold 25 is provided with an intake air temperature/intake air pressure sensor 25a that detects a temperature and pressure of the air therein.

Output of the intake air temperature/intake air pressure sensor 25a is transmitted to the engine control unit 100.

The tumble generation valve 26 is a valve that throttles a portion of a passage of the intake manifold 25 in accordance with a driving state in order to promote a tumble flow and improve a combustion state in each of the combustion chambers.

The tumble generation valve 26 is controlled by the engine control unit 100.

The exhaust system 30 discharges the exhaust gas (the burnt gas) discharged from the exhaust ports of the cylinder head 13 to the outside.

The exhaust system 30 has an exhaust manifold 31, an exhaust pipe 32, a front catalyst 33, a rear catalyst 34, silencers 35, and the like.

The exhaust manifold 31 is a collecting pipe that collects the exhaust gas discharged from the exhaust ports of the cylinders in the cylinder head 13 and introduces the exhaust gas to an inlet portion of a turbine 42.

The exhaust pipe 32 discharges the exhaust gas discharged from an outlet of the turbine 42 to the outside.

The exhaust pipe 32 is sequentially provided with the front catalyst 33, the rear catalyst 34, and the silencers 35 from an upstream side (the turbine 42 side).

Each of the front catalyst 33 and the rear catalyst 34 is an exhaust gas treatment device in which CO, HC, and NOx in the exhaust gas are subjected to treatment, so as to purify the exhaust gas.

Each of the front catalyst 33 and the rear catalyst 34 has a three-way catalyst in which alumina as a carrier, for instance, carries precious metal such as platinum, rhodium, or palladium.

The front catalyst 33 has an air-fuel ratio sensor (A/F sensor) 33a and a rear O2 sensor 33b.

The air-fuel ratio sensor 33a and the rear O2 sensor 33b are respectively provided at an inlet portion and an outlet portion of the front catalyst 33 and each output a signal corresponding to oxygen concentration in the exhaust gas.

The silencer 35 is a muffler that reduces sound energy of the exhaust gas.

The silencer 35 is provided near an outlet of the exhaust pipe 32.

For instance, two of the silencers 35 are provided. A region near the outlet of the exhaust pipe 32 is branched into two, and each of the two branched portion introduces the exhaust gas to the silencer 35.

The turbocharger 40 is an exhaust gas turbine supercharger that compresses the fresh air by using energy of the exhaust gas in the engine 1.

The turbocharger 40 includes the compressor 41, the turbine 42, a waste gate valve 43, an air-bypass passage 44, an air-bypass valve 45, and the like.

The compressor 41 is a centrifugal compressor that is provided in the intake duct 21 of the intake system 20 on a downstream side of the air cleaner 22.

The turbine 42 includes a turbine wheel that is rotationally driven by pressure of the exhaust gas flowing from the exhaust manifold 31, and drives a compressor wheel of the compressor 41 for rotation.

The waste gate valve 43 opens/closes a waste gate passage, through which some of the exhaust gas bypasses the turbine 42 from an upstream side to the downstream side thereof, for purposes of supercharging pressure control and the like.

The waste gate valve 43 is driven to be opened/closed by a solenoid 43a as an electric actuator, and an opening degree thereof is controlled such that an actual opening degree approximates a target opening degree set by the engine control unit 100.

This target opening degree is set by supercharging pressure feedback control. In the supercharging pressure feedback control, actual supercharging pressure that is detected by the throttle upstream pressure sensor 24a, for instance, is brought close to target supercharging pressure set by the engine control unit 100.

The waste gate valve 43 is provided with a lift amount sensor and executes feedback control on the opening degree thereof. Output of the lift amount sensor is transmitted to the engine control unit 100.

The air-bypass passage 44 is a pipe line that communicates between a region on the upstream side of the compressor 41 (the air cleaner 22 side) and a region on the downstream side thereof (the intercooler 23 side) in the intake duct 21 and makes the air bypass the compressor 41.

The air-bypass valve 45 is provided in an intermediate portion of the air-bypass passage 44 to open/close the air-bypass passage 44.

The air-bypass valve 45 is a solenoid valve, an opened state and a closed state of which is switched in accordance with an air-bypass valve opening/closing request as a command from the engine control unit 100.

The fuel supply device 50 injects and supplies fuel (gasoline) stored in an unillustrated fuel tank into the combustion chambers of the engine 1.

The fuel supply device 50 has a feed line 51, a high-pressure fuel pump 52, a high-pressure fuel line 53, injectors 54, and the like.

The feed line 51 is a pipe line through which the fuel that is discharged by a feed pump provided in the fuel tank is delivered to the high-pressure fuel pump 52.

The high-pressure fuel pump 52 operates in an interlocking manner with the camshafts in the cylinder head 31 to pressurize and discharge the fuel supplied from the feed line 51.

The high-pressure fuel pump 52 is subjected to feedback control such that actual fuel pressure approximates target fuel pressure set by the engine control unit 100 through duty ratio control.

The high-pressure fuel line 53 is a branch pipe retaining the fuel, which is discharged by the high-pressure fuel pump 52, in a pressurized state and supplying the fuel to the injector 54 in each of the cylinders.

The injector 54 is an injection valve that injects the fuel introduced from the high-pressure fuel line 53 into the combustion chamber in accordance with an injection signal generated by the engine control unit 100.

The injector 54 is a direct injection injector, one of which is provided in each of the cylinders.

The engine control unit (ECU) 100 comprehensively controls the engine 1 and auxiliaries thereof.

The engine control unit 100 has an information processing unit such as a CPU, storage units such as RAM and ROM, an input/output interface, and a bus that couples these components.

The accelerator pedal sensor 101, an atmospheric pressure sensor 102, and the like are coupled to the engine control unit 100.

The accelerator pedal sensor 101 detects an operation amount of an accelerator pedal through which a driver inputs an accelerator operation.

The engine control unit 100 sets the driver requested torque on the basis of output of the accelerator pedal sensor 101 and the like and controls the opening degree of the throttle valve 24, a fuel injection amount, fuel injection timing, ignition timing, the supercharging pressure, the valve timing, an EGR amount, and the like such that actually generated torque by the engine 1 substantially matches the driver requested torque.

The atmospheric pressure sensor 102 is a pressure sensor that detects pressure of atmosphere around the vehicle.

Furthermore, a transmission control unit 110 and a behavior control unit 120 are coupled to the engine control unit 100 via an on-board LAN device such as a CAN communication system.

The transmission control unit (TCU) 110 comprehensively controls an automatic transmission, which is not illustrated, and auxiliaries thereof. The automatic transmission changes the output of the engine 1 and transmits the changed output to drive wheels.

The transmission control unit 110 transmits information on a currently-selected travel range in the transmission and the like to the engine control unit 100.

For instance, the transmission control unit 110 transmits information on which travel range, such as a forward range or a reverse range, is currently selected in the transmission or which non-travel range, such as a neutral range or a parking range, is selected therein to the engine control unit 100.

The behavior control unit 120 includes a hydraulic control unit (HCU) that can individually adjust braking forces of right and left, front and rear wheels of the vehicle by using solenoid valves, and executes anti-lock brake control, vehicle behavior control, and the like. In the vehicle behavior control, when vehicle behavior such as understeer or oversteer occurs, yaw moment is generated in a direction to eliminate the behavior by a difference in the braking force between the right and left wheels.

A vehicle speed sensor that generates a vehicle speed pulse signal at a proportional frequency to a rotational speed of each of the wheels is coupled to the behavior control unit 120.

The behavior control unit 120 transmits vehicle speed information that is calculated on the basis of output of the vehicle speed sensor to the engine control unit 100.

In addition, in one implementation, the engine control unit 100 may control opening/closing of the air-bypass valve 45 on the basis of the intake air amount of the engine 1 detected by the airflow meter 22a and the rotational speed of the crankshaft 11 detected by the crank angle sensor 11a, so as to prevent compressor surge, and may serve as a "controller".

In the engine 1 with the above-described configuration, in the case where the throttle valve 24 is rapidly closed from a state where the accelerator opening degree is large and the supercharging pressure is relatively high, for instance, due to release of a driver's foot from the accelerator pedal, the supercharged fresh air is blocked by the throttle valve 24. As a result, the pressure in a portion of the intake system 20 on the upstream side of the throttle valve 24 is increased, and the compressor surge possibly occurs. The compressor surge is pressure vibrations between the throttle valve 24 and blades of the compressor 41.

A description will hereinafter be made on a generation mechanism of the compressor surge.

Figure 2:
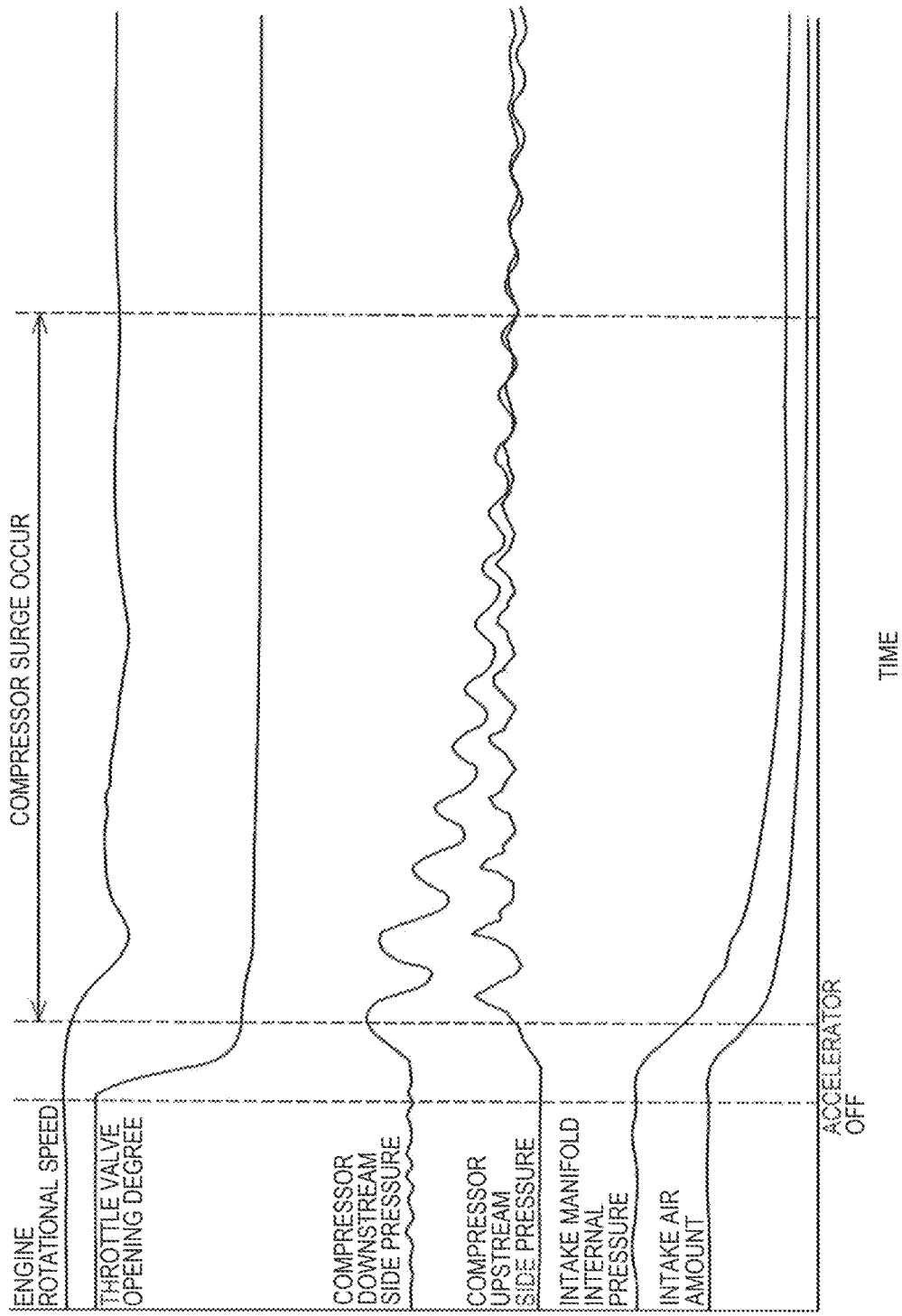
FIG. 2 is a chart that illustrates one example of changes in various parameters at a time when compressor surge occurs to the engine in FIG. 1.

FIG. 2 is a chart that illustrates one example of changes in various parameters at a time when the compressor surge occurs to the engine in FIG. 1.

In FIG. 2, a horizontal axis represents time, and a vertical axis represents the engine rotational speed (the number of rotation per unit time of the crankshaft 11), the opening degree of the throttle valve 24, downstream side pressure of the compressor 41, upstream side pressure of the compressor 41, pressure in the intake manifold 25, and the intake air amount of the engine 1.

When the driver rapidly releases his/her foot from the accelerator pedal from a depressing state, the driver requested torque rapidly decreases. Accordingly, the engine control unit 100 sets a target opening degree of the throttle valve 24 to 5% (an idling state), for instance.

Using the throttle actuator, the throttle valve 24 starts a closing operation substantially at a maximum operation speed in accordance with a change in the target opening degree.

When the throttle valve 24 is rapidly brought into a fully closed state, the fresh air that flows from the compressor 41 to the cylinder head 13 side is blocked by the throttle valve 24, and the pressure (intake pipe pressure) in a portion of the intake duct 21 from the compressor 41 to the throttle valve 24 is increased.

Furthermore, the pressure wave that has been reflected by hitting the throttle valve 24 flows back to the compressor 41 through the intake duct 21. The pressure wave then hits the blades of the compressor 41 and is bounced. Accordingly, the air is repeatedly separated and attached to blade surfaces. In this way, periodical pressure fluctuations (the pressure vibrations) occur in the intake pipe.

Of such pressure fluctuations, in particular, the pressure fluctuation to such an extent that an amplitude is large, predominant noise is generated, and the compressor 41 and the turbine 42 is adversely influenced is referred to as the "compressor surge".

Note that, even when the throttle valve 24 is in the idling state, a required air amount for an idling operation is suctioned to the engine 1 via the intake manifold 25. For this reason, the pressure in the portion between the compressor 41 and the throttle valve 24 gradually increases. Thus, the compressor surge often settles in approximately one second, for instance.

Figure 3:
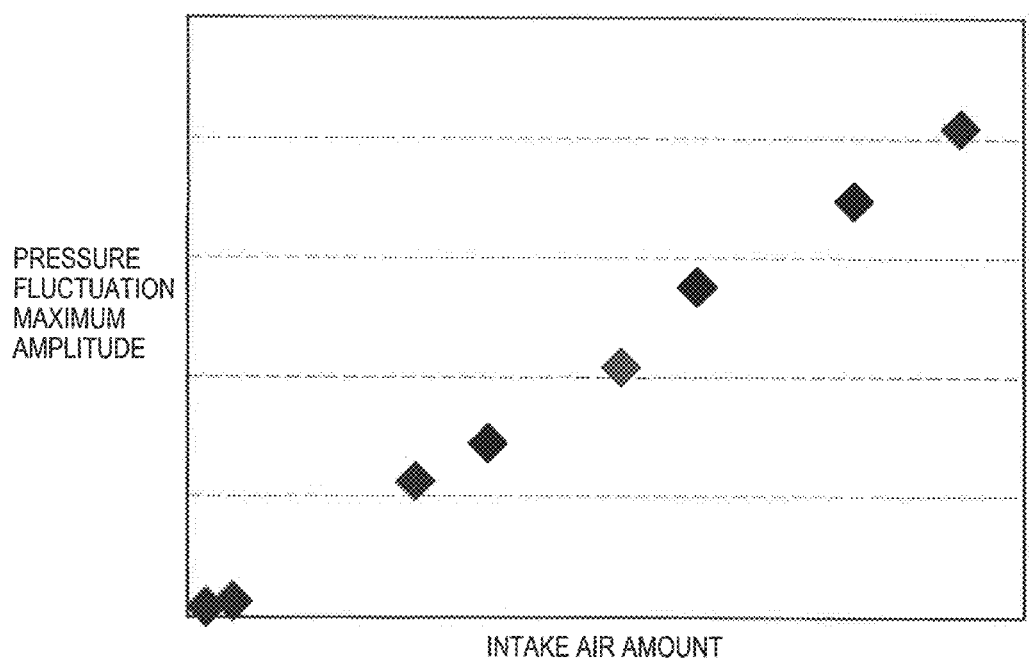
FIG. 3 is a chart that illustrates correlation between a compressor surge amplitude in the engine in FIG. 1 and an intake air amount thereof.

FIG. 3 is a chart that illustrates a correlation between the compressor surge amplitude in the engine in FIG. 1 and the intake air amount thereof.

A horizontal axis represents the intake air amount that is detected by the airflow meter 22a. The vertical axis represents a maximum amplitude of the pressure fluctuation in the intake pipe between the downstream side of the compressor 41 and the upstream side of the throttle valve 24, and the pressure is detected by the throttle upstream pressure sensor 24a (the engine rotational speed is constant).

As illustrated in FIG. 3, the amplitude of the pressure fluctuation is increased linearly in accordance with an increase in the intake air amount.

Figure 4:
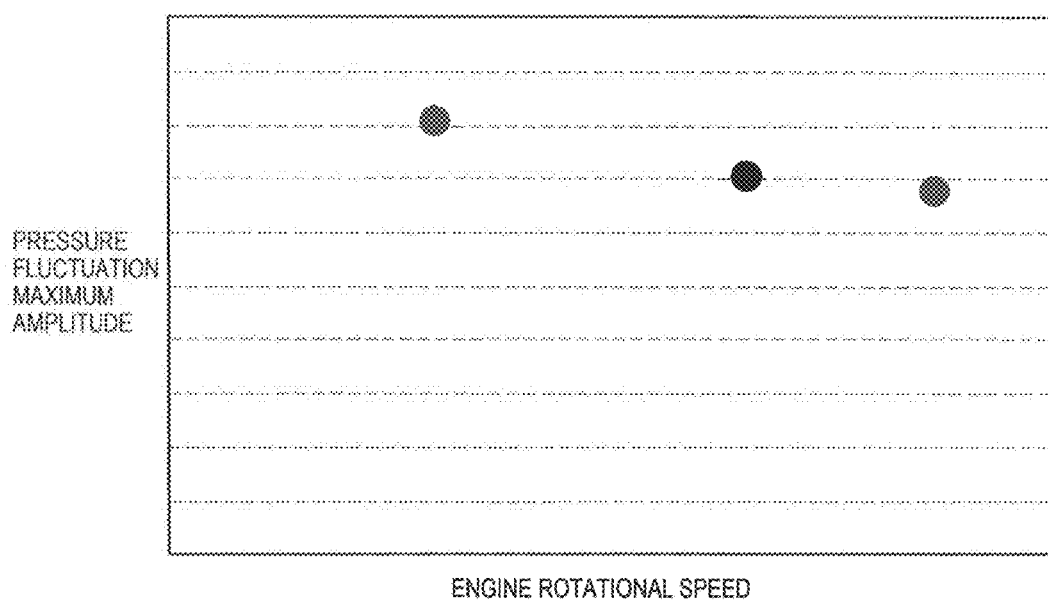
FIG. 4 is a chart that illustrates a correlation between the compressor surge amplitude in the engine in FIG. 1 and an engine rotational speed.

FIG. 4 is a chart that illustrates a correlation between the compressor surge amplitude in the engine in FIG. 1 and the engine rotational speed.

A horizontal axis represents the number of rotation of the crankshaft 11 (the so-called engine rotational speed) that is detected by the crank angle sensor 11a. The vertical axis represents the maximum amplitude of the pressure fluctuation in the intake pipe between the downstream side of the compressor 41 and the upstream side of the throttle valve 24, and the pressure is detected by the throttle upstream pressure sensor 24a.

As illustrated in FIG. 4, the amplitude of the pressure fluctuation is increased in accordance with a decrease in the engine rotational speed.

The air-bypass valve control device of the example uses a phenomenon that is unique to the compressor surge described so far, and temporarily brings the air-bypass valve 45 into the opened state only when the occurrence of the compressor surge is unavoidable. In this way, while the adverse influence on the drivability is minimized, the compressor surge is reliably prevented, so as to improve silence and secure reliability of the turbocharger 40.

A description will hereinafter be made on compressor surge suppression control by the air-bypass valve control device of the example.

Figure 5:
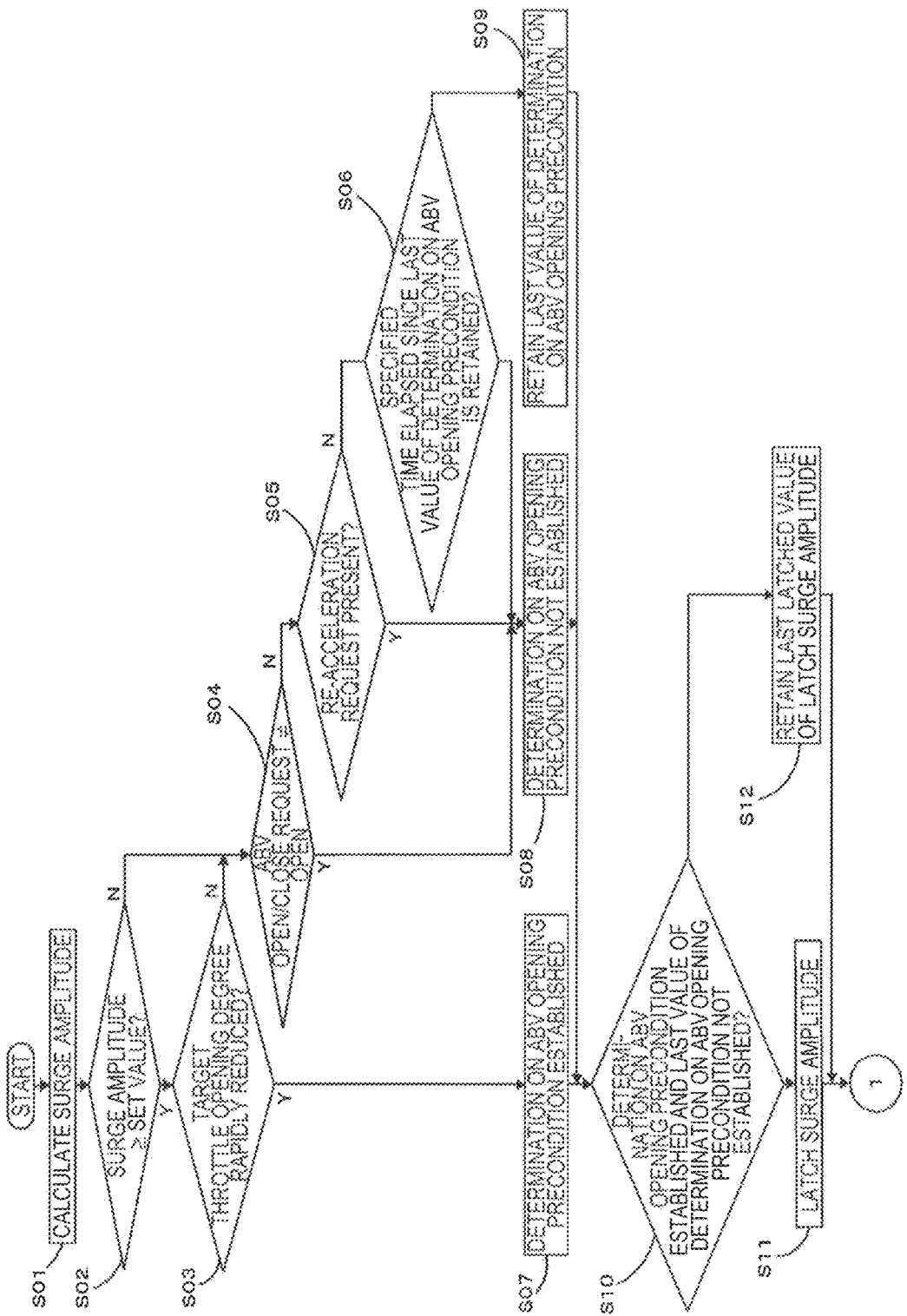
FIG. 5 is a first partial view of a flowchart that illustrates compressor surge suppression control by an air-bypass valve control device of the example.
Figure 6:
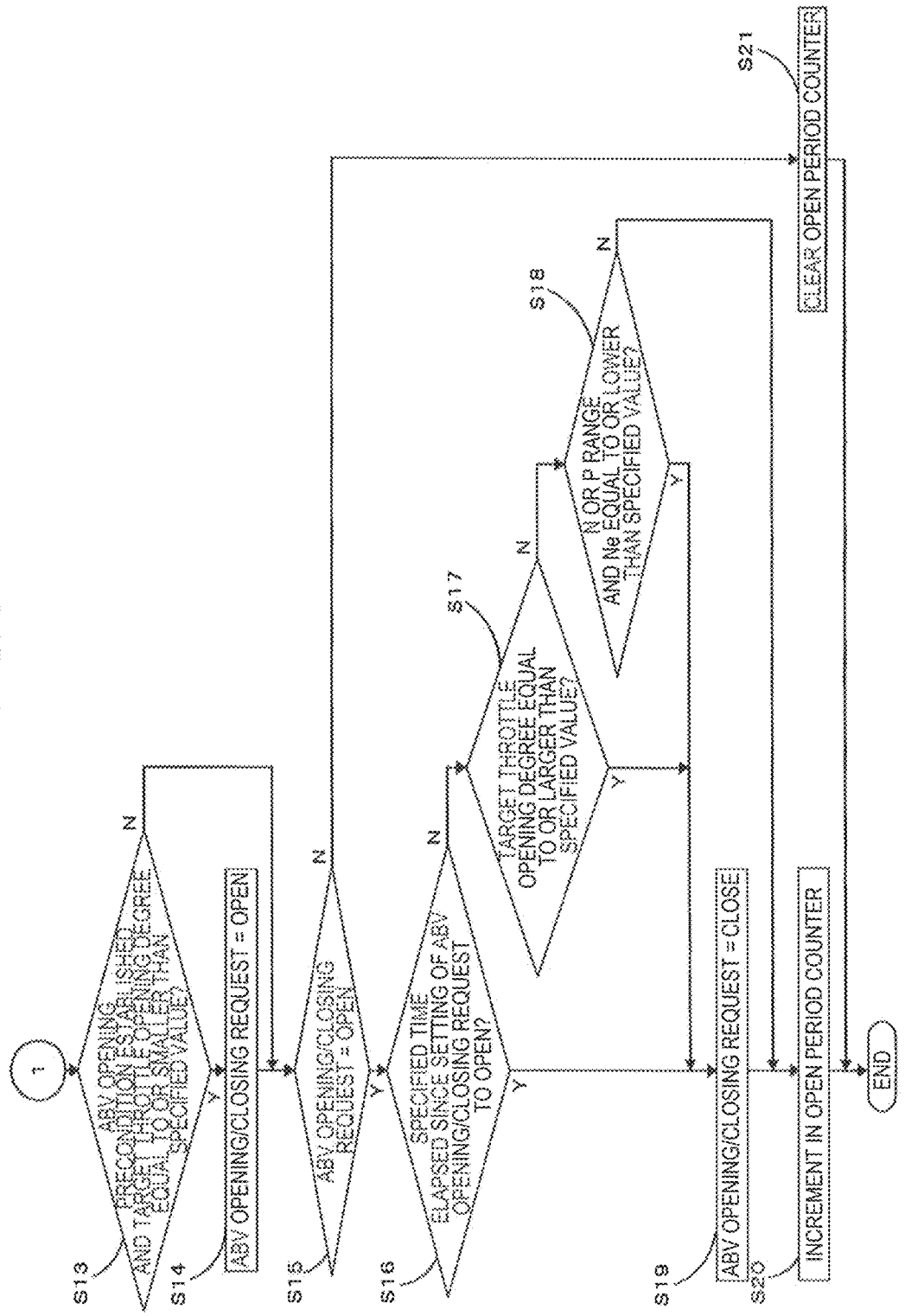
FIG. 6 is a second partial view of the flowchart that illustrates the compressor surge suppression control by the air-bypass valve control device of the example.

FIG. 5 and FIG. 6 are a first partial view and a second partial view of a flowchart that illustrates the compressor surge suppression control by the air-bypass valve control device of the example.

In this control, a surge amplitude is calculated in step S01. In steps S02 to S09, a determination on an air-bypass valve opening precondition is made. In steps S10 to S12, surge amplitude latch is performed when the determination on the air-bypass valve opening precondition is established. In steps S13 to S14, an air-bypass valve opening determination is made. In steps S15 to S19, an air-bypass valve closing determination is made.

A description will hereinafter be made on steps of the process in sequence.

Step S01: Calculate Surge Amplitude

The engine control unit 100 calculates the pressure amplitude of the compressor surge (the surge amplitude) that possibly occurs on the basis of the intake air amount of the engine 1 obtained from the output of the airflow meter 22 and the rotational speed (the number of rotation per unit time) of the crankshaft 11 obtained from the output of the crank angle sensor 11a.

The correlation between the surge amplitude and each of the intake air amount and the engine rotational speed as illustrated in FIG. 3 and FIG. 4, for instance, is calculated by an experiment or a simulation in advance. Then, an approximate expression or a map that is obtained from the above result can be used to calculate the surge amplitude.

A calculated value of the surge amplitude is increased in accordance with the increase in the intake air amount and is increased in accordance with the decrease in the crankshaft rotational speed.

After the surge amplitude is calculated, the process proceeds to step S02.

Step S02: Determine Surge Amplitude

The engine control unit 100 compares the surge amplitude, which is calculated in step S01, with a set value that is set in advance.

This set value is set for each type of engines or each type of vehicle on which the air-bypass valve control device is mounted. For instance, consideration is given as to whether the noise generated is of such a degree of loudness that an occupant can actually recognize it at the time when the compressor surge occurs.

If the surge amplitude is equal to or larger than the set value, the process proceeds to step S03. If not, the process proceeds to step S04.

Step S03: Determine Rapid Decrease in Target Throttle Opening Degree

The engine control unit 100 determines whether a target throttle opening degree set in accordance with the driver requested torque decreases (rapidly decreases) at a change rate per time that is equal to or higher than a predetermined value.

For instance, when the driver requested torque rapidly decreases due to the release of the driver's foot from the accelerator pedal from the depressed state, the target throttle opening degree also rapidly decreases. As a result, the throttle valve 24 is rapidly closed.

If it is determined that the target throttle opening degree rapidly decreases, the process proceeds to step S07. If not, the process proceeds to step S04.

Step S04: Determine Air-Bypass Valve Opening/Closing Request

The engine control unit 100 determines a state of an air-bypass valve opening/closing request as a control command to the air-bypass valve 45. If the opening request is not output (if the air-bypass valve 45 is closed), the process proceeds to step S08. If not, the process proceeds to step S05.

Step S05: Determine Presence or Absence of Re-Acceleration Request

The engine control unit 100 monitors a transition of the driver requested torque and determines presence or absence of a re-acceleration request (an increase of the driver requested torque again to a predetermined magnitude or larger).

If the re-acceleration request is present, the process proceeds to step S08. If not, the process proceeds to step S06.

Step S06: Determine Elapsed Time Since Last Determination on Air-Bypass Valve Opening Precondition The engine control unit 100 compares an elapsed time since the last determination on the air-bypass valve opening precondition is made (an elapsed time since last step S07 or last step S08) with a predetermined time that is set in advance.

If the elapsed time exceeds the predetermined time, the process proceeds to step S08. If not, the process proceeds to step S09.

Step S07: Determination on Air-Bypass Valve Opening Precondition Established The engine control unit 100 establishes the determination on the air-bypass valve opening precondition as a precondition for execution of the compressor surge suppression control by opening the air-bypass valve.

Thereafter, the process proceeds to step S10.

Step S08: Determination on Air-Bypass Valve Opening Precondition Not Established The engine control unit 100 determines that the air-bypass valve opening precondition is not established.

Thereafter, the process proceeds to step S10.

Step S09: Retain Last Value of Determination on Air-Bypass Valve Opening Precondition The engine control unit 100 retains the last result of the determination on the air-bypass valve opening precondition.

Thereafter, the process proceeds to step S10.

Step S10: Determine Result of Determination on Air-Bypass Valve Opening Precondition The engine control unit 100 monitors a transition of the result of the determination on the air-bypass valve opening precondition.

If the last result is "established", and the second determination result from the last (the result immediately before "established") is "not established", the process proceeds to S11. If not, the process proceeds to step S12.

Step S11: Surge Amplitude Latch

The engine control unit 100 latches (stores information on) a current value (the latest value) of the surge amplitude that is calculated in step S01.

Thereafter, the process proceeds to step S13.

Step S12: Retain Last Value of Surge Amplitude Latch

As the surge amplitude, the engine control unit 100 retains the last latched value as is.

Thereafter, the process proceeds to step S13.

Step S13: Determine Air-Bypass Valve Opening Precondition/Determine Target Throttle Opening Degree The engine control unit 100 determines whether the determination on the air-bypass valve opening precondition is established and whether the target throttle opening degree is equal to or smaller than a predetermined value.

If the above condition is satisfied, the process proceeds to step S14. If not, the process proceeds to step S15.

Step S14: Air-Bypass Valve Opening/Closing Request=Open

The engine control unit 100 sets the air-bypass valve opening/closing request as the control command to the air-bypass valve 45 in the compressor surge suppression control to "open", outputs a valve opening command to the air-bypass valve 45, and opens the air-bypass valve 45.

Thereafter, the process proceeds to step S15.

Step S15: Determine Air-Bypass Valve Opening/Closing Request

The engine control unit 100 determines a current state of the air-bypass valve opening/closing request. If the air-bypass opening/closing request is "open", the process proceeds to step S16. If not, the process proceeds to step S21.

Step S16: Lapse of Predetermined Time Since Setting of Air-Bypass Valve Opening/Closing Request to "Open"

The engine control unit 100 determines whether a time in which the state of the air-bypass valve opening/closing request remains "open" has exceeded a predetermined air-bypass valve open period on the basis of a counter value of an open period counter. The open period counter is a timer that counts a time in which the air-bypass valve 45 is in the opened state.

The air-bypass valve open period is set to be extended in accordance with the increase in the currently-latched surge amplitude. A description will hereinafter be made on an example of a setting method.

Figure 7:
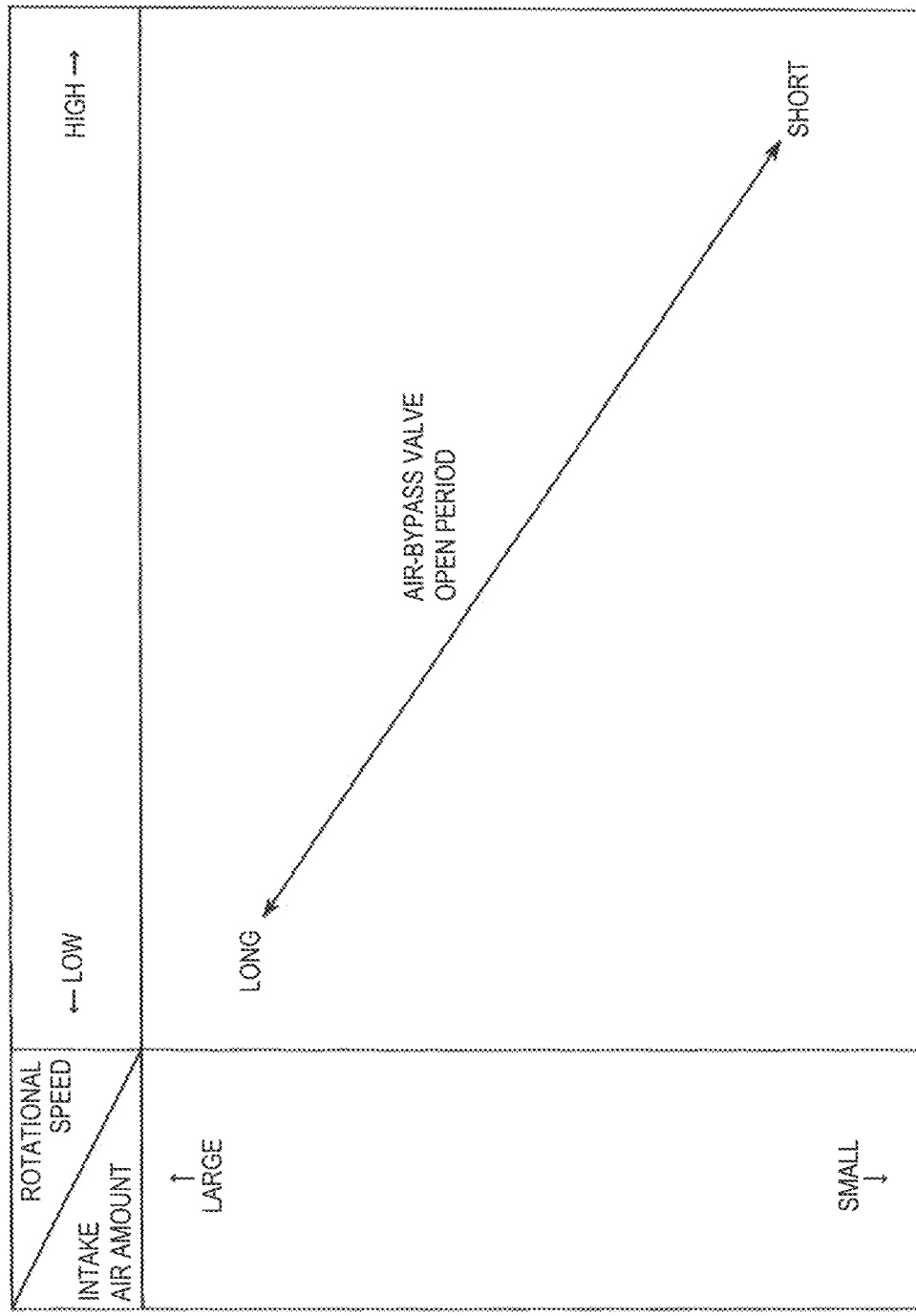
FIG. 7 is a map that schematically illustrates a correlation among the intake air amount, the engine rotational speed, and an air-bypass valve open period in the air-bypass valve control device of the example.

FIG. 7 is a map that schematically illustrates a correlation among the intake air amount, the engine rotational speed, and the air-bypass valve open period in the air-bypass valve control device of the example.

As illustrated in FIG. 7, this map is configured that the valve open period of the air-bypass valve 45 is read from the intake air amount of the engine 1 and the rotational speed (the number of rotation) of the crankshaft 11 in the engine 1 immediately before the throttle valve 24 is rapidly closed.

In the map illustrated in FIG. 7, the valve open period of the air-bypass valve 45 is set to be extended in accordance with the increase in the amplitude of the pressure fluctuation by the compressor surge, the occurrence of which is predicted if the air-bypass valve 45 is maintained in the closed state.

As described above, the amplitude of the pressure fluctuation is increased in accordance with the increase in the intake air amount, and is increased in accordance with the decrease in the rotational speed of the crankshaft 11. Thus, also in the map illustrated in FIG. 7, the valve open period is set to be extended in accordance with the increase in the intake air amount and be extended in accordance with the decrease in the rotational speed of the crankshaft 11.

If the "open" state in the air-bypass valve opening/closing request exceeds the set air-bypass valve open period, the process proceeds to step S19. If not, the process proceeds to step S17.

Step S17: Determine Target Throttle Opening Degree

The engine control unit 100 compares the current target throttle opening degree with a predetermined value that is set in advance.

This is because the compressor surge does not substantially occur in the case where only a certain degree of the target opening degree (the opening degree that is maintained after the closing operation) of the throttle valve 24 remains even when the throttle valve 24 is rapidly closed from the supercharging state.

For instance, this predetermined value is set at approximately 18° as an angle position from the fully closed state of the throttle valve 24.

If the target throttle opening degree is equal to or larger than the predetermined value, it is considered that the compressor surge whose noise and the like can be problematic does not occur, and the process proceeds to step S19.

If not, the process proceeds to step S18.

Step S18: Determine Non-travel Range/Engine Rotational Speed

The engine control unit 100 determines whether the vehicle is in a non-travel state where the N (neutral) range or the P (parking range) range is currently selected in the transmission on the basis of the information from the transmission control unit 110.

The engine control unit 100 also detects an engine rotational speed Ne (the number of rotation per minute of the crankshaft 11) on the basis of the output of the crank angle sensor 11a.

If the range corresponding to the non-travel state is selected in the transmission and the engine rotational speed Ne is equal to or lower than a predetermined value, it is considered that so-called revving (racing) occurs at a low speed. Then, the process proceeds to step S19. If not, the process proceeds to step S20.

A lower limit value of this engine rotational speed Ne is set on the basis of the engine rotational speed at which the speed of the engine 1 is low, generation of noise is inhibited, and masking of actuation noise, which is generated during driving of the air-bypass valve 45, by the engine noise is substantially difficult (the actuation noise is recognized by the occupant).

Step S19: Air-Bypass Valve Opening/Closing Request=Close

The engine control unit 100 sets the air-bypass valve opening/closing request in the compressor surge suppression control to "close", outputs a valve closing command to the air-bypass valve 45, and closes the air-bypass valve 45.

Thereafter, the process proceeds to step S20.

Step S20: Open Period Counter Increment

The engine control unit 100 causes an increment in (counts up) the counter value of the open period counter.

Thereafter, a series of the process is terminated (returned).

Step S21: Clear Open Period Counter

The engine control unit 100 clears (resets) the counter value of the open period counter.

Thereafter, a series of the process is terminated (returned).

According to the example that has been described so far, following effects can be obtained. (1) Such a characteristic that the amplitude of the pressure fluctuation in the intake pipe is increased in accordance with the increase in the intake air amount of the engine 1 is used to determine necessity of the compressor surge suppression control, in which the air-bypass valve 45 is temporarily brought into the opened state on the basis of the intake air amount immediately before rapid closing of the throttle valve 24. In this way, the occurrence of the compressor surge at a predetermined amplitude or larger is appropriately determined, and the air-bypass valve 45 is temporarily brought into the opened state only when necessary as a countermeasure. Thus, the compressor surge can reliably be prevented.

In this way, unnecessary opening of the air-bypass valve 45 and the deteriorated drivability of the vehicle, which is caused by a response delay in supercharging during the re-acceleration or the like, can be prevented.

In addition, the compressor surge suppression control is based on the intake air amount. Thus, compared to a case where the pressure in the intake passage on the downstream side of the throttle valve (the pressure in the intake manifold or the like) is used for the control, the compressor surge suppression control is less likely to be influenced by the valve timing and the intake air temperature. Thus, accuracy of the control can be improved. (2) The first predetermined value of the intake air amount is set such that intervention of opening control of the air-bypass valve 45 is promoted at the low engine speed, at which the compressor surge is more likely to occur. In this way, the opening control of the air-bypass valve 45 can appropriately be executed. (3) The valve open period of the air-bypass valve 45 is set to be extended when the intake air amount of the engine 1 is large in the state where the compressor surge is more likely to occur. In this way, the compressor surge can reliably be inhibited. (4) The valve open period of the air-bypass valve 45 is set to be extended when the rotational speed of the crankshaft 11 is low in the state where the compressor surge is more likely to occur. In this way, the compressor surge can reliably be inhibited. (5) In the case where the target opening degree of the throttle valve 24 after an abrupt closing operation exceeds a predetermined upper limit value, the air-bypass valve 45 is maintained in the closed state regardless of the other conditions. In this way, the deterioration of the drivability can be prevented.

For instance, when the driver does not completely return the accelerator pedal, there is a high possibility that the driver has an intention of the re-acceleration. Accordingly, by maintaining the air-bypass valve 45 in the closed state, the response delay in the supercharging, which possibly occurs when the accelerator pedal is depressed again, is inhibited. In this way, the drivability can be improved. (6) During revving (racing) of the engine at the low speed in the non-travel range, the air-bypass valve 45 is maintained in the closed state regardless of the other conditions. In this way, the actuation noise of the air-bypass valve 45, which is not masked by the noise of the engine 1, is prevented from giving a sense of discomfort to the occupant. In this way, the silence of the vehicle can be secured. (7) Rapid closing of the throttle valve 24 is detected on the basis of a change in the driver requested torque. In this way, the control can be intervened at timing before the throttle valve 24 actually starts being actuated. Thus, the compressor surge can reliably be prevented.

As it has been described so far, according to this example, the air-bypass valve control device that prevents the occurrence of the compressor surge without deteriorating the drivability can be provided.

Modified Examples

The present invention is not limited to the example that has been described so far, and various modifications and changes can be made thereto. These modifications and changes also fall within the technical scope of the present invention. (1) The configurations of the engine and the air-bypass valve control device are not limited to those in the above example and can appropriately be changed.

For instance, a cylinder layout, the number of the cylinders, the valve drive method, the fuel injection method, and the like of the engine are not limited to the configuration in the example and can appropriately be changed.

In addition, the engine in the example is the turbocharged direct injection gasoline engine, for instance. However, the engine is not limited thereto. As long as an engine turbocharges and uses the throttle valve for output adjustment, the present invention can be applied thereto. (2) In the example, the necessity of the control, in which the air-bypass valve is temporarily brought into the opened state, and the valve open period are determined in accordance with the intake air amount of the engine and the engine rotational speed. However, even when the information on the engine rotational speed is not used and thus the control is only based on the intake air amount, for instance, the effects can be obtained to a certain extent. Thus, such an example also belongs to the technical scope of the present invention.

In addition, a parameter other than the intake air amount and the engine rotational speed may be added as an element that is used to determine the necessity of the control and set the valve open period.

The invention claimed is:

1. An air-bypass valve control device configured to be installed in an engine, the engine comprising:
   an intake passage configured to introduce air into the engine;
   a compressor provided in the intake passage and capable of compressing the air;
   a throttle valve disposed downstream of the compressor in the intake passage;
   an air-bypass passage configured to bypass the compressor from an upstream region to a downstream region thereof in the intake passage; and
   an air-bypass valve having an electric actuator to open/close the air-bypass passage,
   the air-bypass valve control device comprising:
   an intake air amount detector configured to detect an intake air amount of the engine; and
   a controller configured to temporarily bring the air-bypass valve into an opened state, to provide a temporary open state in the air-bypass valve, in a case where the intake air amount of the engine immediately before a decrease in an opening degree of the throttle valve is equal to or larger than a first predetermined value when the opening degree of the throttle valve decreases at a predetermined speed or higher, and
   wherein the controller is further configured to:
   determine a preset length of time in which the air-bypass valve retains the temporary open state, wherein the preset length of time determined by the controller is increased in accordance with an increase in the intake air amount of the engine immediately before the decrease in the opening degree of the throttle valve, and
   bring the air-bypass valve into a closed state in response to an elapsing of the preset length of time.

2. The air-bypass valve control device according to claim 1, wherein the first predetermined value is set such that the air-bypass valve is temporarily brought into the opened state in a case where a controller determined amplitude value of a pressure fluctuation in the intake passage becomes equal to or larger than a second predetermined value, the controller determined amplitude value being an amplitude expected when the air-bypass valve is set in a closed state.

3. The air-bypass valve control device according to claim 1, wherein the first predetermined value is set to decrease in accordance with a decrease in a rotational speed of an output shaft of the engine.

4. The air-bypass valve control device according to claim 2, wherein the first predetermined value is set to decrease in accordance with a decrease in a rotational speed of an output shaft of the engine.

5. The air-bypass valve control device according to claim 1, wherein
the controller is configured to maintain the air-bypass valve in the closed state in a case where a target opening degree of the throttle valve after a closing operation of the throttle valve is equal to or larger than a predetermined upper limit value.

6. The air-bypass valve control device according to claim 2, wherein
the controller is configured to maintain the air-bypass valve in the closed state in a case where a target opening degree of the throttle valve after a closing operation of the throttle valve is equal to or larger than a predetermined upper limit value.

7. The air-bypass valve control device according to claim 3, wherein the controller is configured to maintain the air-bypass valve in the closed state in a case where a target opening degree of the throttle valve after a closing operation of the throttle valve is equal to or larger than a predetermined upper limit value.

8. The air-bypass valve control device according to claim 4, wherein the controller is configured to maintain the air-bypass valve in the closed state in a case where a target opening degree of the throttle valve after a closing operation of the throttle valve is equal to or larger than a predetermined upper limit value.

9. The air-bypass valve control device according to claim 1, wherein
the controller is configured to maintain the air-bypass valve in the closed state in a case where a vehicle equipped with the engine is in a non-travel state and a rotational speed of an output shaft of the engine is equal to or lower than a predetermined lower limit value.

10. The air-bypass valve control device according to claim 2, wherein
the controller is configured to maintain the air-bypass valve in the closed state in a case where a vehicle equipped with the engine is in a non-travel state and a rotational speed of an output shaft of the engine is equal to or lower than a predetermined lower limit value.

11. The air-bypass valve control device according to claim 3, wherein
the controller is configured to maintain the air-bypass valve in the closed state in a case where a vehicle equipped with the engine is in a non-travel state and the rotational speed of the output shaft of the engine is equal to or lower than a predetermined lower limit value.

12. The air-bypass valve control device according to claim 4, wherein
the controller is configured to maintain the air-bypass valve in the closed state in a case where a vehicle equipped with the engine is in a non-travel state and the rotational speed of the output shaft of the engine is equal to or lower than a predetermined lower limit value.

13. The air-bypass valve control device according to claim 1, wherein the electric actuator is a solenoid that directly adjusts a valve component of the air-bypass valve to open/close the air-bypass passage.

14. The air-bypass valve control devise according to claim 1,
wherein, when the opening degree of the throttle valve decreases at a predetermined speed or higher, the controller is configured to:
execute a determination whether or not the intake air amount of the engine immediately before a decrease in the opening degree of the throttle valve is equal to or larger than the first predetermined value, and
temporarily bring the air-bypass valve into the open state based on a result of the determination that the intake air amount of the engine immediately before the decrease in an opening degree of the throttle valve is equal to or larger than the first predetermined value.

15. An air-bypass valve control device configured to be installed in an engine, the engine comprising:
an intake passage configured to introduce air into the engine;
a compressor provided in the intake passage and capable of compressing the air;
a throttle valve disposed downstream of the compressor in the intake passage;
an air-bypass passage configured to bypass the compressor from an upstream region to a downstream region thereof in the intake passage; and
an air-bypass valve having an electric actuator to open/close the air-bypass passage,
the air-bypass valve control device comprising:
an intake air amount detector configured to detect an intake air amount of the engine; and
a controller configured to temporarily bring the air-bypass valve into an opened state, to provide a temporary open state in the air-bypass valve, in a case where the intake air amount of the engine immediately before a decrease in an opening degree of the throttle valve is equal to or larger than a first predetermined value when the opening degree of the throttle valve decreases at a predetermined speed or higher, and
wherein the controller is further configured to:
determine a preset length of time in which the air-bypass valve retains the temporary open state, wherein the preset length of time determined by the controller is increased in accordance with a decrease in a rotational speed of an output shaft of the engine, and
bring the air-bypass valve into a closed state in response to an elapsing of the preset length of time.

16. An air-bypass valve control device configured to be installed in an engine, the engine comprising:
an intake passage configured to introduce air into the engine;
a compressor provided in the intake passage and capable of compressing the air;
a throttle valve disposed downstream of the compressor in the intake passage an air-bypass passage configured to bypass the compressor from an upstream region to p downstream region thereof in the intake passage; and
an air-bypass valve having an electric actuator to open/close the air-bypass passage,
the air-bypass valve control device comprising:
an intake air amount detector configured to detect an intake air amount of the engine; and
a controller configured to temporarily bring the air-bypass valve into an opened state, to provide a temporary open state in the air-bypass valve, in a case where the intake air amount of the engine immediately before a decrease in an opening degree of the throttle valve is equal to or larger than a first predetermined value when the opening degree of the throttle valve decreases at a predetermined speed or higher, and wherein the controller is configured to:

acquire a rotational speed of the output shaft of the engine using a sensor equipped in the engine, wherein the controller is further configured to:

determine a preset length of time in which the air-bypass valve retains the temporary open state based on both the intake air amount and the rotational speed of the output shaft of the engine, and bring the air-bypass valve into a closed state in response to an elapsing of the preset length of time.

* * * * *